(12) United States Patent
Guen et al.

(10) Patent No.: US 9,997,761 B2
(45) Date of Patent: Jun. 12, 2018

(54) RECHARGEABLE BATTERY

(71) Applicant: SAMSUNG SDI CO., LTD., Yongin-si, Gyeonggi-do (KR)

(72) Inventors: Min-Hyung Guen, Yongin-si (KR); Chi-Young Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 23 days.

(21) Appl. No.: 14/574,245

(22) Filed: Dec. 17, 2014

(65) Prior Publication Data

US 2015/0255777 A1    Sep. 10, 2015

(30) Foreign Application Priority Data

Mar. 10, 2014 (KR) ........................ 10-2014-0027901

(51) Int. Cl.
 *H01M 2/34* (2006.01)
 *H01M 2/12* (2006.01)
 (Continued)

(52) U.S. Cl.
 CPC ......... *H01M 2/345* (2013.01); *H01M 2/0202* (2013.01); *H01M 2/0237* (2013.01);
 (Continued)

(58) Field of Classification Search
 CPC ....... H01M 2/1235; H01M 2/30; H01M 2/345
 (Continued)

(56) References Cited

U.S. PATENT DOCUMENTS

2006/0183020 A1* 8/2006 Davidson ............... H01M 2/08
                                                            429/174
2012/0189884 A1    7/2012 Guen
                 (Continued)

FOREIGN PATENT DOCUMENTS

DE    10 2012 200 868 A1    7/2013
EP    2 348 559 A1    7/2011
(Continued)

OTHER PUBLICATIONS

EPO Search Report dated Jul. 9, 2015, for corresponding European Patent application 15152484.0, (5 pages).
(Continued)

*Primary Examiner* — Sarah A. Slifka
*Assistant Examiner* — Victoria H Lynch
(74) *Attorney, Agent, or Firm* — Lewis Roca Rothgerber Christie LLP (57) ABSTRACT

A rechargeable battery having a decreased size by including a membrane of an external short-circuit part in a cap plate is provided. The rechargeable battery includes a case having an electrode assembly accommodated therein, a cap plate closing an opening of the case, first and second electrode terminals extending through the cap plate and electrically coupled to the electrode assembly, and an external short-circuit part coupled to an outer portion of the case for electrically disconnecting or short-circuiting the first and second electrode terminals from or to each other. The external short-circuit part includes a membrane coupled to an inner surface of the cap plate and electrically coupled to the second electrode terminal, and a connection plate electrically coupled to the first electrode terminal and spaced from the membrane. The membrane extends around an outer circumference of a short-circuit hole in the cap plate to cover the short-circuit hole.

12 Claims, 9 Drawing Sheets

(51) Int. Cl.
  *H01M 2/30* (2006.01)
  *H01M 2/04* (2006.01)
  *H01M 2/02* (2006.01)
(52) U.S. Cl.
  CPC ........... *H01M 2/04* (2013.01); *H01M 2/0473* (2013.01); *H01M 2/1235* (2013.01); *H01M 2/30* (2013.01); *H01M 2200/20* (2013.01)
(58) Field of Classification Search
  USPC .................................................. 429/121, 53
  See application file for complete search history.

(56) References Cited

U.S. PATENT DOCUMENTS

| | | | | |
|---|---|---|---|---|
| 2012/0237802 A1* | 9/2012 | Byun | .................... | H01M 2/043 429/53 |
| 2012/0258339 A1* | 10/2012 | Kim | ...................... | H01M 2/065 429/61 |
| 2012/0315516 A1* | 12/2012 | Kim | ................. | H01M 10/0525 429/61 |
| 2013/0130072 A1* | 5/2013 | Guen | .................... | H01M 2/043 429/61 |

FOREIGN PATENT DOCUMENTS

| | | |
|---|---|---|
| EP | 2 595 214 A1 | 5/2013 |
| KR | 10-2011-0025056 A | 3/2011 |

OTHER PUBLICATIONS

EPO Office Action dated Nov. 13, 2017, for corresponding European Patent Application No. 15152484.0 (4 pages).

\* cited by examiner

RECHARGEABLE BATTERY

CROSS-REFERENCE TO RELATED APPLICATION

This application claims priority to and the benefit of Korean Patent Application No. 10-2014-0027901 filed in the Korean Intellectual Property Office on Mar. 10, 2014, the entire contents of which are incorporated herein by reference.

BACKGROUND

1. Field

The present invention relates generally to a rechargeable battery having an external short-circuit part.

2. Description of the Related Art

Unlike a primary battery, a rechargeable battery can be repeatedly charged and discharged. A small capacity rechargeable battery may be used in a small portable electronic device such as a mobile phone, a laptop computer, or a camcorder, and a large capacity rechargeable battery may be used, for example, as a power supply for driving a motor of a hybrid vehicle, or the like.

Rechargeable batteries include an electrode assembly including a positive electrode and a negative electrode formed on respective surfaces of a separator, a case for receiving the electrode assembly embedded therein, a cap plate closing an opening of the case, and a negative electrode terminal and a positive electrode terminal penetrating through the cap plate and electrically connected to the electrode assembly.

Since the rechargeable battery may be repeatedly charged and discharged, excessive heat may be generated in the case and/or an electrolyte in the case may decompose. The generation of heat or the decomposition of the electrolyte as described above may increase an internal pressure of the rechargeable battery. The increase in the internal pressure may cause ignition or explosion of the rechargeable battery.

Therefore, in order to prevent the ignition or the explosion of the rechargeable battery due to the increase in the internal pressure, the case may be provided with an external short-circuit part. When the internal pressure of the rechargeable battery increases, the external short-circuit part short-circuits the negative electrode and the positive electrode of the electrode assembly at an outer portion of the rechargeable battery. When the external short-circuit part is short-circuited, a current is discharged such that a charging state of the electrode assembly is lowered.

For example, the external short-circuit part may include a connection plate connected to the negative electrode terminal and a membrane installed in a short-circuit hole of the cap plate. The membrane is spaced apart from the connection plate when the rechargeable battery is operating normally. The cap plate and the membrane are connected to the positive electrode terminal. The membrane is configured to be reversed and contact the connection plate when the internal pressure in the rechargeable battery increases.

In conventional short-circuit parts, an outer surface of the cap plate includes a step located along an outer circumference of a terminal hole in the cap plate. The step is configured to fix the membrane on an outer surface of the cap plate. The membrane is welded to the step in the outer surface of the cap plate to close the short-circuit hole. In addition, the connection plate protrudes outwardly from the cap plate and faces the membrane. Accordingly, conventional short-circuit parts may increase the size of the rechargeable battery.

In addition, in conventional short-circuit parts, the space between the membrane and the connection plate is small. Accordingly, when the membrane is reversed due to an increase in internal pressure, the amount of the membrane that contacts the connection plate is increased. Further, the size of conventional membranes is limited to the size of the short-circuit hole in the cap plate. Accordingly, the internal pressure applied to the membrane is limited by the size of the short-circuit hole, Therefore, it may be difficult to uniformly reverse the membrane when the internal pressure in the rechargeable battery increases. Additionally, contact resistance between the membrane and the connection plate may be increased due to the non-uniform reversion of the membrane.

Furthermore, since the weld coupling the membrane to the cap plate is provided on the outer surface of the cap plate, the weld may be exposed to external air, moisture, and foreign materials, which may corrode the weld.

The above information disclosed in this Background section is only for enhancement of understanding of the background of the described technology and therefore it may contain information that does not form part of the prior art.

SUMMARY

One embodiment of the present invention is directed to a rechargeable battery having a decreased size due to the inclusion a membrane of an external short-circuit part in a cap plate. Further, one embodiment of the present invention is directed to a rechargeable battery having an decreased amount of contact between a connection plate and a membrane in the reversed position.

Further, one embodiment of the present invention is directed to a rechargeable battery having decreased contact resistance between a membrane and a connection plate. Further, one embodiment of the present invention is directed to a rechargeable battery having increased strength of a weld coupling a membrane around a short-circuit hole in a cap plate.

An exemplary embodiment provides a rechargeable battery including a case having an electrode assembly accommodated therein, a cap plate closing an opening of the case, first and second electrode terminals extending through the cap plate and electrically coupled to the electrode assembly, and an external short-circuit part coupled to an outer portion of the case for electrically disconnecting or short-circuiting the first and second electrode terminals from or to each other. The external short-circuit part includes a membrane coupled to an inner surface of the cap plate and electrically coupled to the second electrode terminal. The membrane extends around an outer circumference of a short-circuit hole in the cap plate to cover the short-circuit hole. The external short-circuit part also includes a connection plate electrically coupled to the first electrode terminal and spaced from the membrane.

The cap plate may include a first step extending around an outer circumference of the short-circuit hole, the first step having an inner diameter larger than an inner diameter of the short-circuit hole, and the membrane may be coupled to the first step in the cap plate.

The cap plate may include a second step between the first step and the short-circuit hole, the second step having an inner diameter that is larger than the inner diameter of the short-circuit hole and smaller than the inner diameter of the first step.

The connection plate may include a plate part coupled to the first electrode terminal, and a cylindrical part protruding from the plate part toward the membrane. The cylindrical part may be in the short-circuit hole and spaced from an inner surface of the short-circuit hole.

The connection plate may further include a short-circuit protrusion protruding from a lower end of the cylindrical part toward the membrane.

A lowermost end of the short-circuit protrusion and a top surface of the second step in the cap plate may have a height difference therebetween.

The membrane may include a first reversion inducing groove for inducing primary reversion of the membrane in the vicinity of a boundary between the first step and the second step in the cap plate.

The membrane may further include a second reversion inducing groove for inducing secondary reversion of the membrane in the vicinity of a boundary between the second step and the short-circuit hole.

A first thickness of the membrane in an area of the first reversion inducing groove may be smaller than a second thickness of the membrane in an area of the second reversion inducing groove.

The rechargeable battery may further include an insulator coupled to a through-hole of the connection plate and a closure coupled to the insulator. The insulator may have an outlet for discharging internal pressure when the membrane is reversed. The closure may be configured to discharge the internal pressure and block introduction of foreign materials into the outlet.

The insulator may include an inner insulating part in the cylindrical part and an outer insulating part connected to the inner insulating part. The outer insulating part may extend along outer surfaces of the plate part and the cylindrical part. At least a part of the outer insulating part may be received in the short-circuit hole.

The membrane may extend in the same direction as a portion of the outer insulating part that is in the short-circuit hole and the cylindrical part.

The inner insulating part may include a first inserting part form-fit to the through-hole, a bottom, and an inner surface of the cylindrical part. The inner insulating part may have an open upper side. The inner insulating part may also include a first barrier radially spaced apart from the first inserting part to form an accommodating groove therebetween.

The closure may include a second barrier inserted into the open upper side of the first inserting part and inserted into the accommodating groove. The closure may also include a cover part connected to one side of the second barrier and covering at least a portion of the first inserting part.

As set forth above, according to an exemplary embodiment, the membrane is attached to the outer circumference of the short-circuit hole in the inner surface of the cap plate to close the short-circuit hole, thereby making it possible to decrease a size of the rechargeable battery.

The connection plate is located on the outer side of the cap plate, and the membrane is located on the inner side of the cap plate, thereby making it possible to decrease the amount of the membrane that is short-circuited to the connection plate when the membrane is reversed.

Since the membrane is installed in the first and second step parts in the inner surface of the cap plate and the first and second step parts have larger diameters than the short-circuit hole, the membrane has an area larger than that of the short-circuit hole. This makes it possible to decrease the electrical contact resistance between the membrane and the connection plate when the membrane is reversed. In addition, since the weld coupling the membrane to the cap plate is not exposed to an external environment, corrosion of the weld due to the external environment may be prevented, thereby making it possible to improve the strength and/or durability of the weld coupling the membrane around the short-circuit hole in the cap plate.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
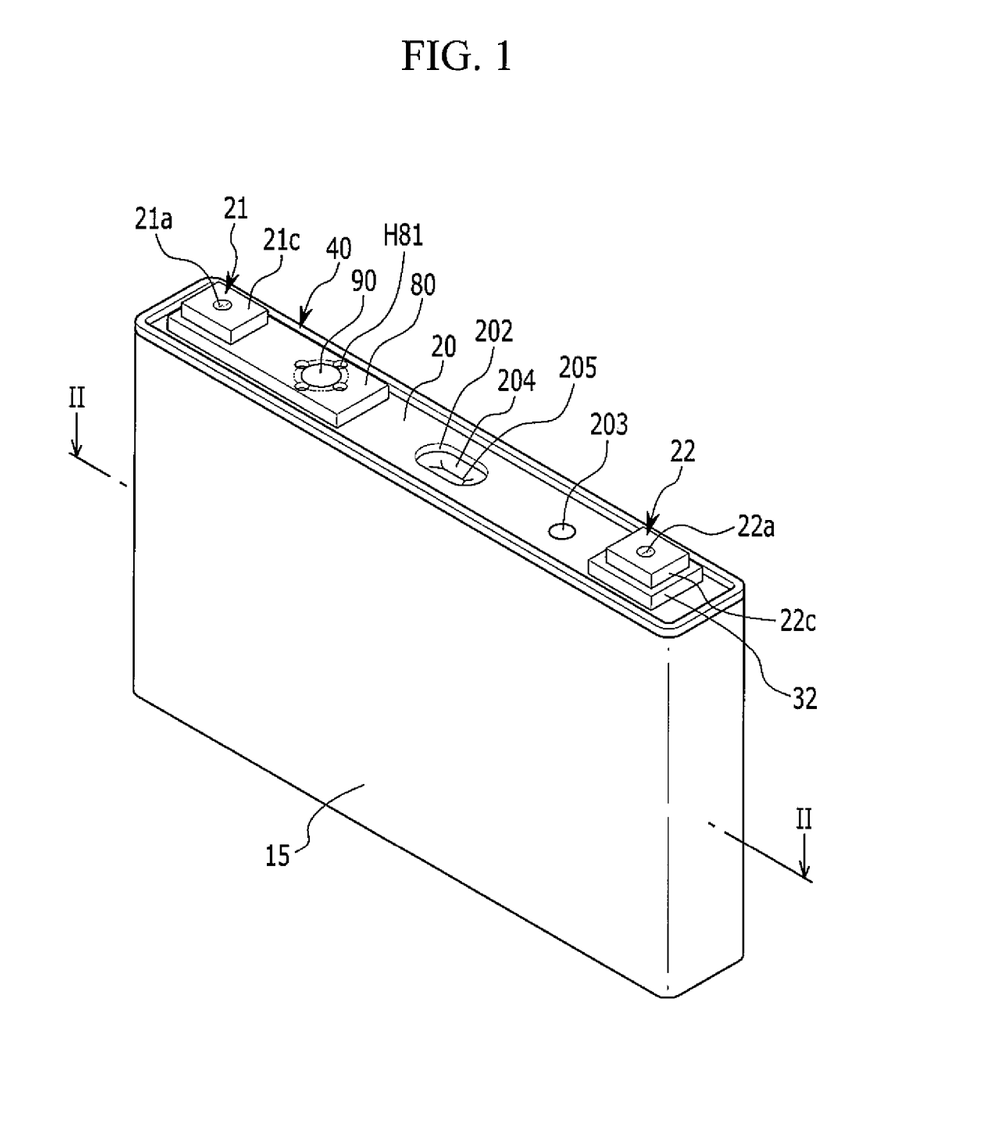
FIG. 1 is a perspective view of a rechargeable battery according to a first exemplary embodiment of the present invention.
Figure 2:
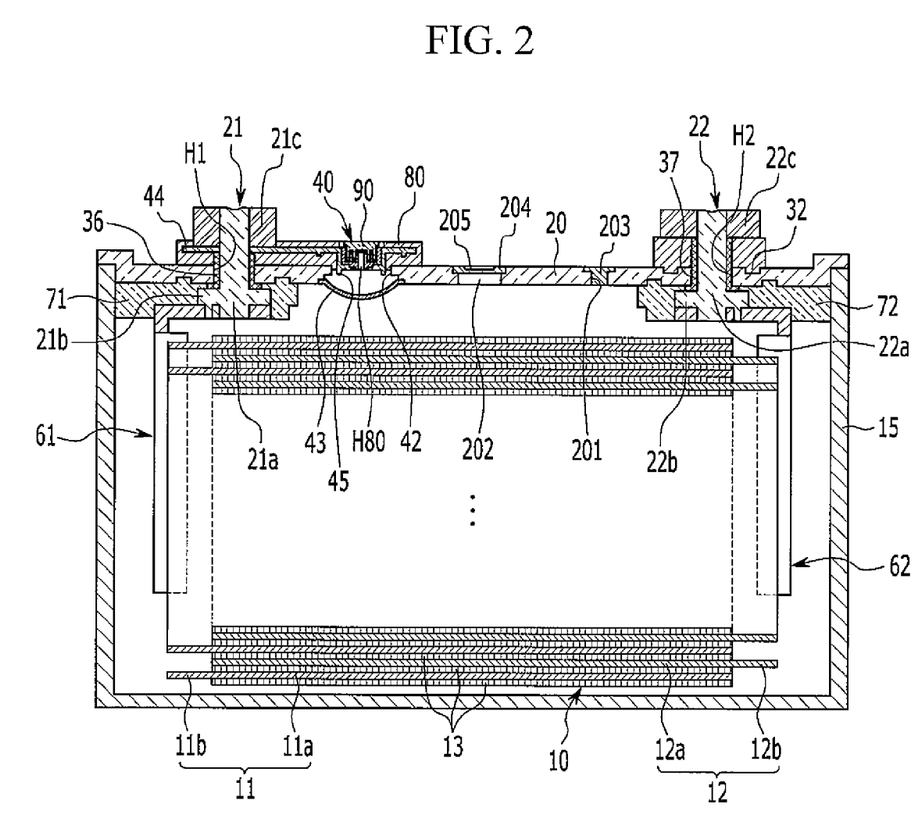
FIG. 2 is a cross-sectional view taken along line II-II of FIG. 1.

FIG. 1 is a perspective view of a rechargeable battery according to a first exemplary embodiment of the present invention, and FIG. 2 is a cross-sectional view taken along line II-II of FIG. 1. Referring to FIGS. 1 and 2, a rechargeable battery according to a first exemplary embodiment of the present invention is configured to include an electrode assembly 10 for performing charging and discharging operations, a case 15 having the electrode assembly 10 enclosed or housed therein, a cap plate 20 closing an opening of the case 15, first and second electrode terminals 21 and 22 installed in terminal holes H1 and H2 of the cap plate 20 and coupled to the electrode assembly 10, and an external short-circuit part 40 for electrically disconnecting or connecting the cap plate 20 and the first electrode terminal 21 from or to each other. The cap plate 20 is electrically coupled to the second electrode terminal 22. For convenience, the first electrode terminal 21 will be called a negative electrode terminal, and the second electrode terminal 22 will be called a positive electrode terminal.

The electrode assembly 10 may be formed by placing a negative electrode 11 and a positive electrode 12 on respective surfaces of a separator 13, which is an insulator, and winding the negative electrode 11, the separator 13, and the positive electrode 12 into a jelly roll state.

The negative electrode 11 and the positive electrode 12 include coated portions 11a and 12a in which a current collector formed of a metal foil on which an active material is applied, and uncoated portions 11b and 12b formed of a current collector on which the active material is not applied.

The uncoated portion 11b of the negative electrode 11 is formed at one end portion of the negative electrode 11 along the wound negative electrode 11. The uncoated portion 12b of the positive electrode 12 is formed at one end portion of the positive electrode 12 along the wound positive electrode 12. The uncoated portions 11b and 12b of the negative and positive electrodes 11 and 12 are located at opposite ends of the electrode assembly 10.

In one example embodiment, the case 15 is formed in a shape of an approximate rectangular parallelepiped so that a space or cavity for accommodating the electrode assembly 10 and an electrolyte is formed within the case 15. One surface of the rectangular parallelepiped case 15 includes an opening in order to facilitate connecting an outside or external component to the electrode assembly 10 housed in the internal space defined by the case 15. The opening also allows the electrode assembly 10 to be inserted into the case 15.

The cap plate 20 is formed of a thin plate and is coupled (e.g., welded) to the opening of the case 15 to close the case 15. The cap plate 20 further includes an electrolyte injection hole 201, a vent hole 202, and a short-circuit hole 42.

The electrolyte injection hole 201 allows an electrolyte to be injected into the case 15 after the cap plate 20 is coupled (e.g., welded) to the case 15. After the electrolyte is injected, the electrolyte injection hole 201 may be sealed by a sealing closure 203.

The vent hole 202 is sealed or closed by a vent plate 204. The vent plate 204 is configured to reduce the internal pressure of the rechargeable battery. When the internal pressure of the rechargeable battery achieves or exceeds a predetermined pressure, the vent plate 204 is configured to rupture or break, such that the vent hole 202 is opened. The vent plate 204 has a notch 205 formed therein in order to induce rupturing.

Additionally, the negative and positive electrode terminals 21 and 22 are installed in terminal holes H1 and H2, respectively, penetrating through the cap plate 20. The negative and positive electrode terminals 21, 22 are electrically coupled to the electrode assembly 10. That is, the negative electrode terminal 21 is electrically coupled to the negative electrode 11 of the electrode assembly 10, and the positive electrode terminal 22 is electrically coupled to the positive electrode 12 of the electrode assembly 10. Therefore, the electrode assembly 10 may be drawn out to the outside of the case 15 through the negative electrode terminal 21 and the positive electrode terminal 22.

The negative and positive electrode terminals 21 and 22 respectively include rivet terminals 21a and 22a installed in the terminal holes H1 and H2 of the cap plate 20, flanges 21b and 22b formed integrally with the rivet terminals 21a and 22a at an inner side of the cap plate 20, and plate terminals 21c and 22c located at an outer side of the cap plate 20 and coupled to the rivet terminals 21a and 22a, for example, by riveting or welding.

Negative and positive electrode gaskets 36 and 37 are inserted between the rivet terminals 21a and 22a of the negative and positive electrode terminals 21 and 22 and inner surfaces of the terminal holes H1 and H2 of the cap plate 20, respectively, to create a seal between the rivet terminals 21a and 22a of the negative and positive electrode terminals 21 and 22 and the cap plate 20. The negative and positive electrode gaskets 36 and 37 also at least partially extend between the flanges 21b and 22b and an inner surface of the cap plate 20, respectively, to further seal between the flanges 21b and 22b and the cap plate 20.

Negative and positive electrode lead tabs 61 and 62 electrically couple the negative and positive electrode terminals 21 and 22 to the uncoated portions 11b and 12b of the negative and positive electrodes 11 and 12 of the electrode assembly 10, respectively. The negative and positive electrode lead tabs 61 and 62 are coupled to lower ends of the rivet terminals 21a and 22a, respectively. The lower ends are of the rivet terminals 21a and 22a are sealed (e.g., caulked) such that the negative and positive electrode lead tabs 61 and 62 function as a conduction structures to the lower ends of the rivet terminals 21a and 22a, respectively, and are supported by the flanges 21b and 22b, respectively.

Negative and positive electrode insulators 71 and 72 are located between the negative and positive electrode lead tabs 61 and 62 and the cap plate 20, respectively, to electrically insulate the negative and positive electrode lead tabs 61 and 62 from the cap plate 20. In addition, the negative and positive electrode insulators 71 and 72 each have one side coupled to the cap plate 20 and another side enclosing the negative and positive electrode lead tabs 61 and 62, the rivet terminals 21a and 22a, and the flanges 21b and 22b, respectively, to stabilize the connection between the components.

Additionally, the positive electrode terminal 22 further includes a top plate 32 located between the plate terminal 22c and the cap plate 20. The positive electrode gasket 37 extends between the rivet terminal 22a of the positive electrode terminal 22 and the top plate 32 to prevent the rivet terminal 22a and the top plate 32 from being directly electrically connected to each other. Accordingly, the rivet terminal 22a is electrically coupled to the top plate 32 through the plate terminal 22c. Therefore, the top plate 32, the cap plate 20, and the case 15 are electrically coupled to the positive electrode terminal 22.

The negative electrode gasket 36 is also located between the rivet terminal 21a of the negative electrode terminal 21 and the external short-circuit part 40. For example, the negative electrode gasket 36 may extend up into a penetration hole of an insulator 80 corresponding to the terminal hole H1. The external short-circuit part 40 is configured to reamin in a spaced state when the internal pressure of the rechargeable battery is below a set value and to be short-circuited when the internal pressure arrives at a set value.

Figure 3:
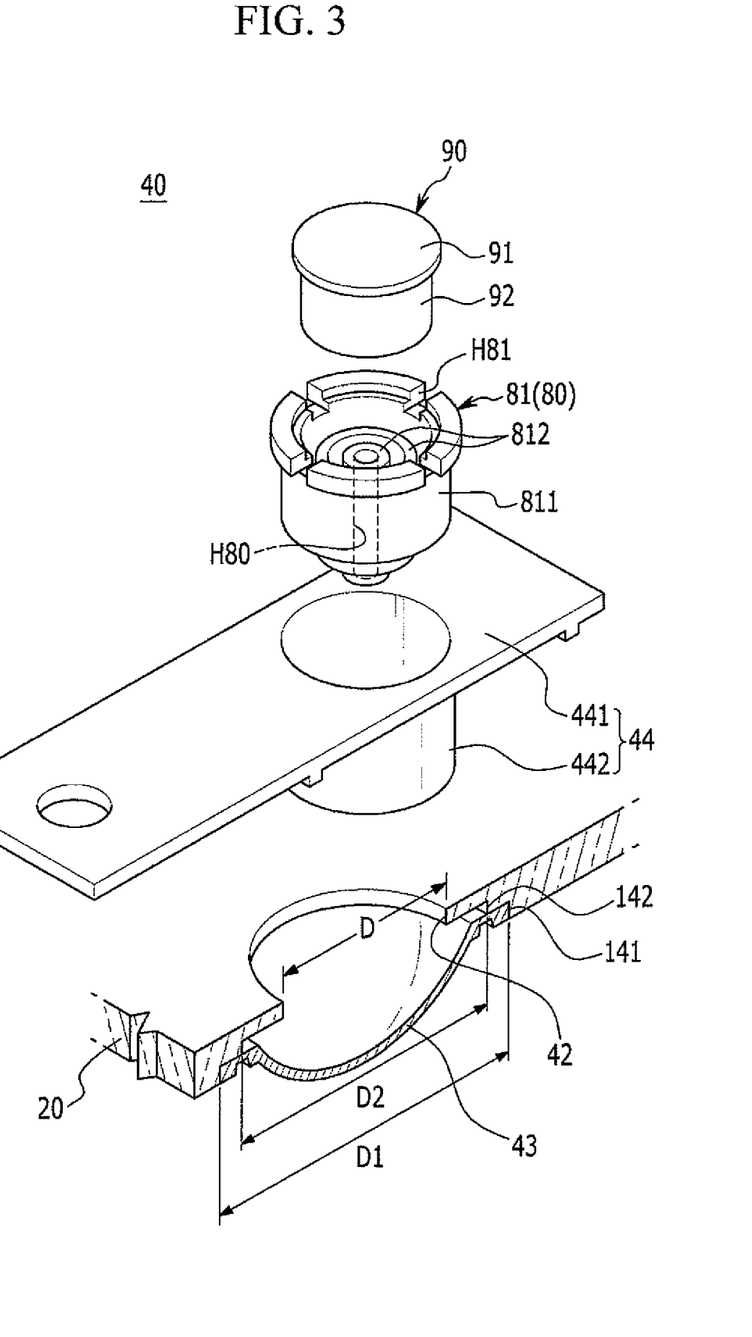
FIG. 3 is a partially exploded perspective view of an external short-circuit part of FIG. 2.
Figure 4:
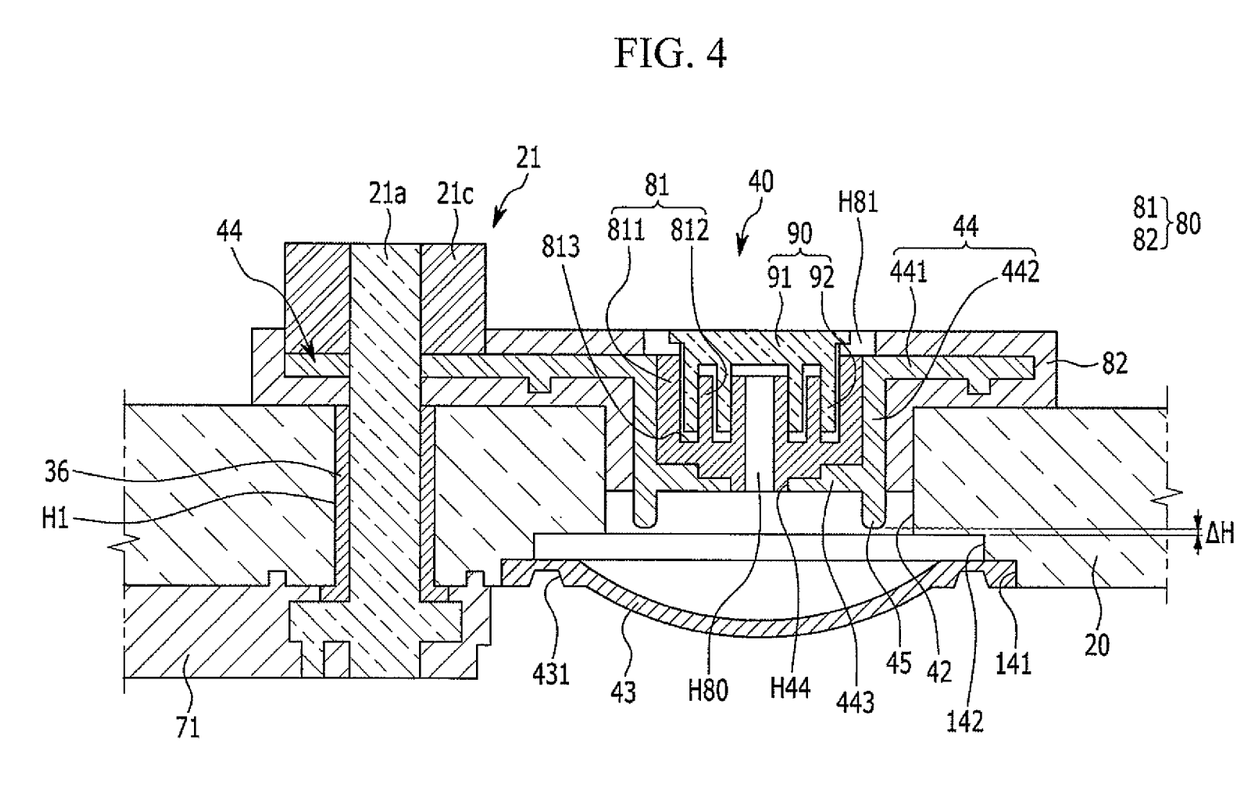
FIG. 4 is a cross-sectional view showing a membrane in the external short-circuit part of FIG. 2 before operation.

FIG. 3 is a partially exploded perspective view of the external short-circuit part 40 of FIG. 2, and FIG. 4 is a cross-sectional view showing the external short-circuit part 40 in a state before operation of a membrane in the external short-circuit part 40 of FIG. 2. Referring to FIGS. 3 and 4, the external short-circuit part 40 includes a membrane 43 electrically coupled to the positive electrode terminal 22 and the cap plate 20, and a connection plate 44 electrically coupled to the negative electrode terminal 21. A portion of the membrane 43 is spaced apart from the connection plate 44.

In one embodiment, the membrane 43 may be attached to an inner surface of the cap plate 20 and may extend around an outer circumference of the short-circuit hole 42 formed in the cap plate 20 to close the short-circuit hole 42. The configuration of the membrane 43 is configured to be reversed depending on the internal pressure of the rechargeable battery. When the internal pressure of the rechargeable battery is normal, the membrane 43 and the connection plate 44 are maintained in a state in which they are spaced apart from each other, and when the internal pressure of the rechargeable battery arrives at predetermined pressure, the configuration of the membrane 43 is configured to reverse such that the membrane 43 is short-circuited to the connection plate 44.

In addition, the external short-circuit part 40 may further include the insulator 80 electrically insulating the connection plate 44 from the membrane 43 and the cap plate 20, and a closure 90 coupled to an outlet H80 of the insulator 80. The closure 90 is configured to prevent external foreign materials and moisture from being introduced into the membrane 43 and to discharge the internal pressure of the rechargeable battery.

An inner surface of the cap plate 20 includes a first step part 141 (e.g., a notch or groove) extending along an outer circumference of the short-circuit hole 42. The first step part 141 has a larger inner diameter D1 than an inner diameter D of the short-circuit hole 42. Additionally, the membrane 43 is coupled (e.g., welded) to the first step part 141.

Accordingly, since the weld coupling the membrane 43 to the cap plate 20 is located along an inner side of the cap plate 20, the weld may be protected from corrosion due to external air, foreign materials, and the like, which may increase the strength or durability of the weld coupling the membrane 43 around the short-circuit hole 42 in the cap plate 20. In addition, the membrane 43 is located on the inner side of the cap plate 20, such that the extent to which the external short-circuit part 40 protrudes outwardly from the cap plate 20 may be decreased. Therefore, a size of the rechargeable battery may be decreased.

Since the connection plate 44 is located on the outer side of the cap plate 20 and the membrane 43 is located on the inner side of the cap plate 20, the amount of the membrane 43 that is short-circuited to the connection plate 44 when the configuration of the membrane 43 is reversed (see FIG. 6) due to the internal pressure may be decreased.

In addition, the membrane 43 has a larger area than an opened area of the short-circuit hole 42, such that a relatively large area of the membrane 43 is exposed to the internal pressure in the rechargeable battery. Accordingly, the relatively large area of the membrane 43 enables the configuration of the membrane 43 to be smoothly reversed by the internal pressure in the rechargeable battery. The relatively large area of the membrane 43 may also decrease the electrical contact resistance when the membrane 43 contacts the connection plate 44.

The inner surface of the cap plate 20 also includes a second step part 142 (e.g., a notch or groove) located between the first step part 141 and the short-circuit hole 42 and extending along an outer circumference of the short-circuit hole 42. The second step part 142 has an inner diameter D2 that is larger than the inner diameter D1 of the short-circuit hole 42 and smaller than the inner diameter D1 of the first step part 141.

Figure 5:
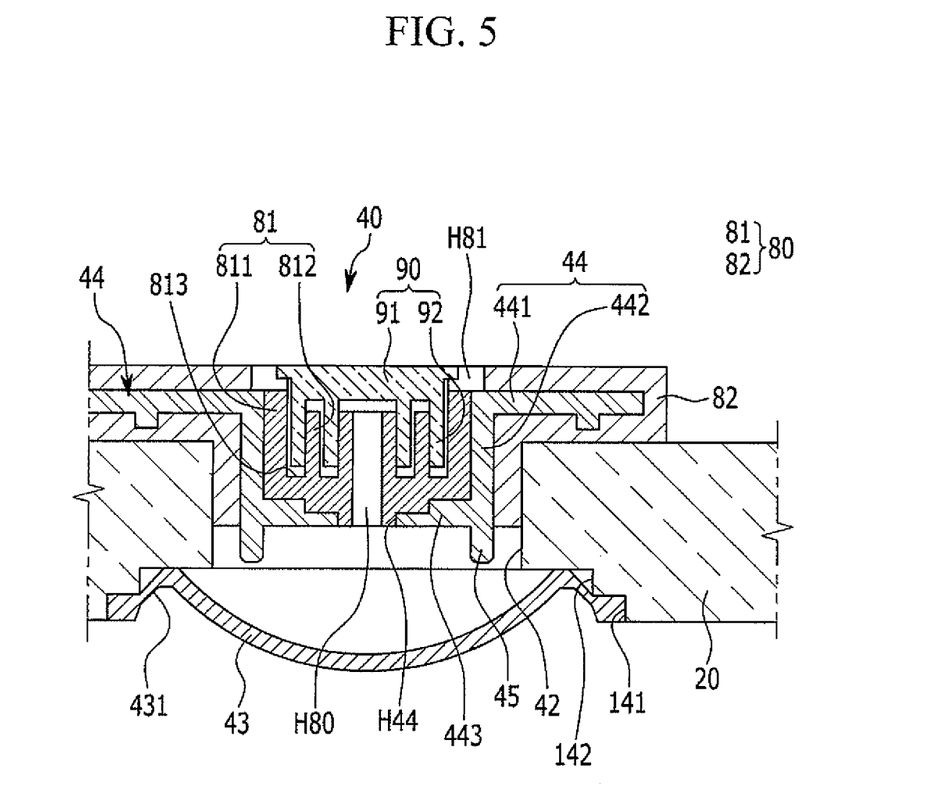
FIG. 5 is a cross-sectional view showing a primary reversion state of the membrane in the external short-circuit part of FIG. 2.
Figure 6:
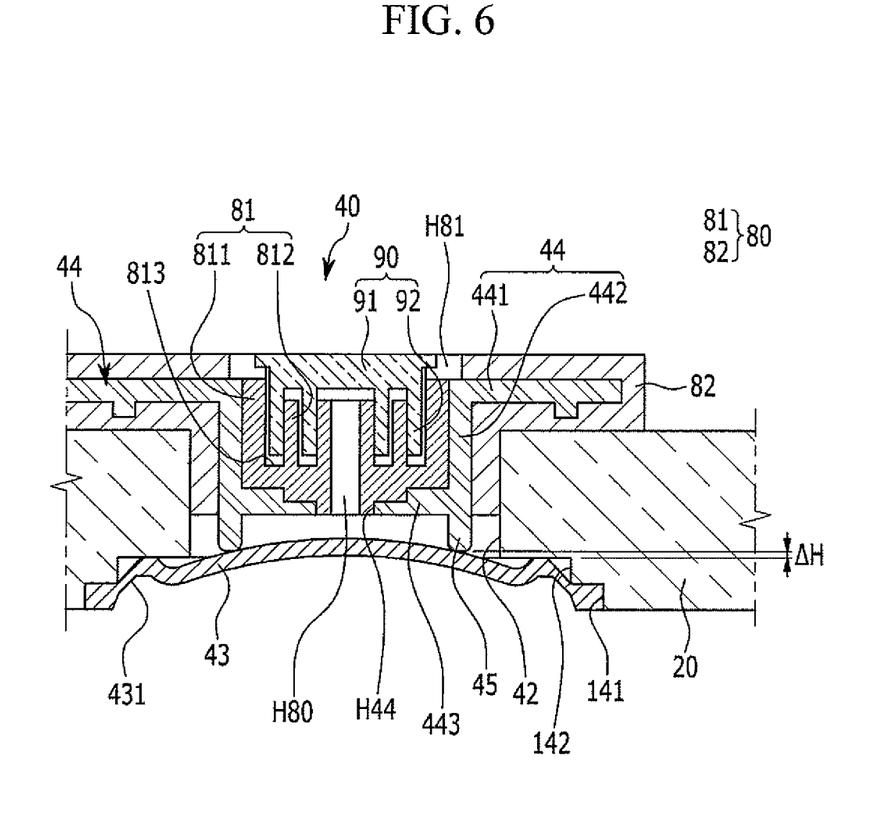
FIG. 6 is a cross-sectional view showing a secondary reversion state of the membrane in the external short-circuit part of FIG. 2.

In the initial position, when the internal pressure in the rechargeable battery is below a threshold pressure, a periphery of the membrane 43 rests flush in the first step part 141, as illustrated in FIG. 4. When the internal pressure exceeds the threshold pressure, a peripheral portion of the membrane 43 is configured to reverse or deflect in the direction of the short-circuit hole 42 and into the second step part 142, as illustrated in FIG. 5. In the primary reversed or deflected position, the peripheral portion of the membrane 43 contacts the second step part 142 in the cap plate 20. If the internal pressure continues to increase, the membrane 43 is configured to be secondarily reversed or deflected, as illustrated in FIG. 6. That is, when the membrane 43 is applied with more uniform internal pressure, the membrane 43 may be uniformly reversed or deflected in the direction of the short-circuit hole 42. Therefore, when the membrane 43 is secondarily reversed, the membrane 43 may uniformly contact a short-circuit protrusion 45 of the connection plate 44 such that a short-circuit resistance may be minimized.

In addition, as compared with a configuration according to the related art in which the short-circuit hole corresponding to an area of the membrane is formed, the cap plate 20 according to a first exemplary embodiment further includes the second step part 142 located between the first step part 141, which corresponds to an area of the membrane 43, and the short-circuit hole 42. Therefore, the portion of the cap plate 20 in the vicinity of the short-circuit hole 42 is structurally reinforced, such that bending strength of the cap plate 20 may be enhanced.

In addition, the membrane 43 includes a first reversion inducing groove 431 configured to induce the primary reversion of the membrane 43 in the vicinity of a boundary line between the first step part 141 and the second step part 142 in the cap plate 20. The first reversion inducing groove 431 has a circular shape extending circumferentially around the membrane 43 to facilitate the primary reversion of the membrane 43 when the internal pressure in the rechargeable battery rises. In addition, the thickness of the first reversion inducing groove 431 is more uniform than other portions of the membrane 43 to facilitate reversion or deflection of the membrane 43 depending on the internal pressure of the rechargeable battery.

The connection plate 44 includes a plate part 441 coupled to the negative electrode terminal 21 and a cylindrical part 442 protruding from the plate part 441 toward the membrane 43. The cylindrical part 442 of the connection plate 44 is inserted into the short-circuit hole 42 and is spaced apart from an inner surface of the short-circuit hole 42. A through-hole H44 is formed in a bottom 443 of the cylindrical part 442.

The connection plate 44 also includes a short-circuit protrusion 45 protruding from a lower end of the cylindrical part 442 toward the membrane 43. The short-circuit protrusion 45 enables a short-circuit between the membrane 43 and the connection plate 44 when the membrane 43 is reversed or deflected due to the rise in the internal pressure, as illustrated in FIG. 6. The lowermost end of the short-circuit protrusion 45 and the top surface of a second step part 142 have a predetermined height difference ΔH therebetween.

This height difference ΔH prevents the membrane 43 from contacting the short-circuit protrusion 45 when the membrane 43 is in the primary reversed or deflected position (FIG. 5) and the membrane 43 is flush (e.g., horizontal) with the second step part 142 in the cap plate 20. Accordingly, if the membrane 43 is in the primary reversed or deflected position and the membrane 43 is flush with the second step part 142 in the cap plate 20, the height difference ΔH allows the primary reversed membrane 43 to be short-circuited to the short-circuit protrusion 45 of the connection plate 44 only with the application of increased internal pressure in the rechargeable battery.

The insulator 80 is coupled to the through-hole H44 of the connection plate 44, and includes the outlet H80 to discharge the internal pressure when the membrane 43 is secondarily reversed, as illustrated in FIG. 6. The closure 90 is coupled to the insulator 80 to discharge the internal pressure when the membrane 43 is secondarily reversed (FIG. 6) and to block the outlet H80 when the membrane 43 is in a normal state (FIG. 4), thereby blocking foreign materials and moisture from being introduced into the case 15 from the outside through the outlet H80.

The insulator 80 is installed on the cap plate 20 to electrically insulate the cap plate 20 electrified with a positive electrode from the connection plate 44 coupled to the rivet terminal 21a of the negative electrode terminal 21. Since the insulator 80 includes penetration holes corresponding to the terminal hole H1 and the short-circuit hole 42 in the cap plate 20, the insulator 80 does not hinder installation of the rivet terminal 21a or the short-circuit part 40.

In one example embodiment, the insulator 80 includes an inner insulating part 81 and an outer insulating part 82 formed integrally with each other. The insulator 80 may be formed by any suitable process, such as by insertion molding the connection plate 44 to the insulator 80. The inner insulating part 81 is formed in and coupled to the cylindrical part 442 of the connection plate 44 to enable the closure 90 to discharge the internal pressure when the membrane 43 is secondarily reversed (FIG. 6) and to block the introduction of external foreign materials and moisture into the case 15.

The outer insulating part 82 is formed on outer surfaces of the plate part 441 and the cylindrical part 442 and is also coupled to the inner insulating part 81 on an upper surface of the plate part 441. The outer insulating part is located in the short-circuit hole 42 and is configured to electrically insulate the connection plate 44, which is coupled to the negative electrode terminal 21, from the cap plate 20, which is coupled to the positive electrode terminal 22.

In one embodiment, the membrane 43, which is received in the first step part 141 of the cap plate 20, extends away from the short-circuit hole 42 (e.g., the membrane 43 is rounded and extends away from the short-circuit hole 42 in the cap plate 20). Accordingly, the area of the membrane 43 exposed to the internal pressure of the rechargeable battery is greater than an area of the short-circuit hole 42. Therefore, the membrane 43 according to a first exemplary embodiment has a larger surface than related art membranes that have an area corresponding to or substantially equal to the area of the short-circuit hole. The greater surface area of the membrane 43 may also reduce the mechanical resistance against reversing or deflecting the membrane 43 (e.g., the energy required to reverse or deflect the membrane 43 into the primary and secondarily reversed positions may be reduced due to the greater surface area of the membrane 43).

The inner insulating part 81 includes a first inserting part 811 inserted into the cylindrical part 442 of the connection plate 44 and a first barrier 812 provided in the first inserting part 811. The first inserting part 811 is form-fit to the through-hole H44 in the bottom 443 of the cylindrical part 442, the bottom 443 of the cylindrical part 442, and an inner surface of the cylindrical part 442. An upper side of the inner insulating part 81 is open. The first barrier 812 is radially spaced apart from the first inserting part 811 to form an accommodating groove 813 therebetween.

The closure 90 includes a second barrier 92 and a cover part 91 covering at least a portion of the first inserting part 811. The cover part 91 facilitates coupling the closure 90 to the inner insulating part 81. The second barrier 92 is inserted into the accommodating groove 813 of the inner insulating part 81 from the open upper side of the inner insulating part 81. The cover part 91 is connected to one side or end of the second barrier 92 and covers at least a portion of the first inserting part 811.

In an example embodiment, the inner insulating part 81 includes a plurality of first barriers 812 such that a plurality of accommodating grooves 813 are formed in the inner insulating part 81. Additionally, the closure 90 may also include a plurality of second barriers 92 extending into the plurality of accommodating grooves 813.

The closure 90 is configured to increase a path or distance along which foreign materials and moisture must travel or permeate from the outside into the case 15. In this manner, the closure is configured to prevent the permeation of the foreign materials and the moisture into the case 15. The closure 90 also enables the internal pressure in the rechargeable battery to be discharged through the outlet H80 of the inner insulating part 81 when the membrane 43 is secondarily reversed (see FIG. 6).

In one embodiment, the first inserting part 811 and the first barrier 812 of the inner insulating part 81 are concentric cylinders. In addition, in one embodiment, the first inserting part 811 and the second barrier 92 are also concentric cylinders. The second barrier 92 of the closure 90 may be coupled to the accommodating groove 813 of the inner insulating part 81. In one embodiment, the second barrier 92 of the closure 90 and the first barrier 812 of the inner insulating part 81 are loosely coupled to each other while maintaining an assembly tolerance (e.g., a loose fit connection) therebetween. The assembly tolerance between the second barrier 92 and the first barrier 812 enables the internal pressure in the rechargeable battery to be discharged.

In one example embodiment, the closure 90 may be made of a polypropylene (PP) resin, a polycarbonate (PC) resin, a polycarbosilane (PCS) precursor, a PC-acrylonitrile butadiene styrene (PC-ABS) mixture resin, or any of the suitable material.

In the case in which the rechargeable battery according to a first exemplary embodiment is operating normally, such that the internal pressure of the rechargeable battery is within a stable range, the membrane 43 of the external short-circuit part 40 is spaced apart from the short-circuit protrusion 45 of the connection plate 44, as shown in FIG. 4.

FIG. 5 is a cross-sectional view showing the membrane 43 of the external short-circuit part in the primary reversion state. As shown in FIG. 5, when the internal pressure of the rechargeable battery rises, the membrane 43 ascends or deflects toward the short-circuit protrusion 45 of the connection plate 44 and is supported by the second step part 142 in the cap plate 20.

In one embodiment, when the membrane 43 is in the primary reversion state, the membrane 43 is bent along the first reversion inducing groove 431, as illustrated in FIG. 5. The membrane 43 is bent along the first reversion inducing groove 431 and a circumferential portion of the membrane 43 is uniformly supported by the second step part 142 in the cap plate 20.

FIG. 6 is a cross-sectional view showing the membrane 43 in the external short-circuit part 40 in the secondary reversion state. As shown in FIG. 6, when the internal pressure of the rechargeable battery further rises, the membrane 43 further ascends or deflects toward the short-circuit protrusion 45 of the connection plate 44. A circumferential portion of the membrane 43 remains supported by the second step part 142 when the membrane 43 is in the secondary reversion state.

In one embodiment, an outer circumferential portion of the membrane 43 is supported by the second step part 142 and an inner portion of the membrane 43 is secondarily reversed to uniformly contact the short-circuit protrusion 45, as illustrated in FIG. 6. When the membrane 43 is uniformly short-circuited to the short-circuit protrusion 45 of the connection plate 44, a current in the electrode assembly 10 is discharged through the membrane 43 and the connection plate 44, which form a low resistance structure.

When the membrane 43 is primarily and secondarily reversed as illustrated in FIG. 6, the internal pressure in the rechargeable battery sequentially passes through the outlet H80 of the inner insulating part 81, the first barrier 812, and the second barrier 92 and is then discharged to a final outlet H81.

Hereinafter, a second exemplary embodiment of the present invention will be described. A description of the same configurations and/or features as those of the first exemplary embodiment described above will be omitted, and only configurations and/or features different from those of the first exemplary embodiment described above will be described below.

Figure 7:
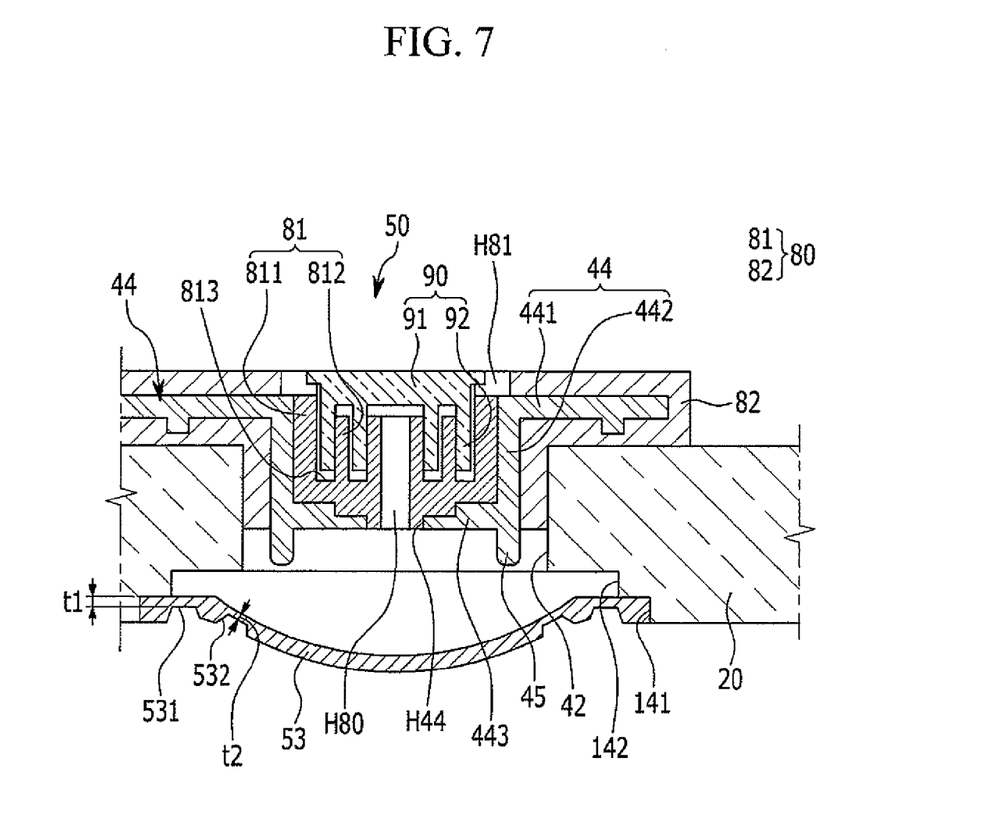
FIG. 7 is a cross-sectional view showing a membrane in an external short-circuit part of a rechargeable battery according to a second exemplary embodiment of the present invention before operation.
Figure 8:
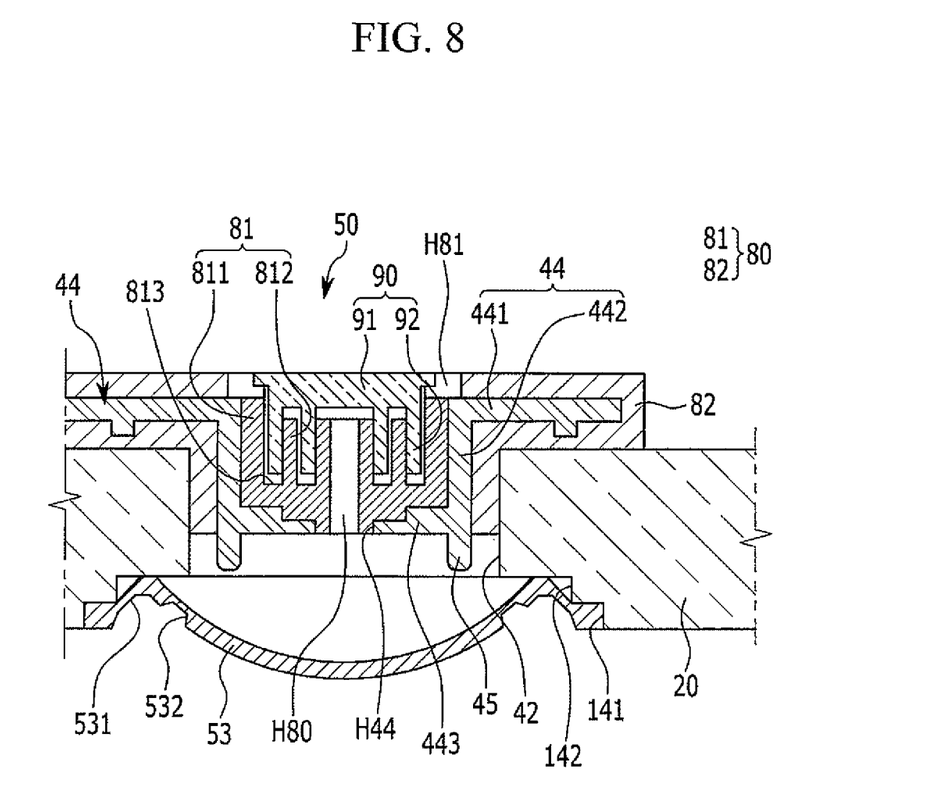
FIG. 8 is a cross-sectional view showing a primary reversion state of the membrane in the external short-circuit part of FIG. 7.

FIG. 7 is a cross-sectional view showing a membrane in an external short-circuit part of a rechargeable battery according to a second exemplary embodiment of the present invention before operation of the membrane. FIG. 8 is a cross-sectional view showing the membrane in the external short-circuit part of FIG. 7 in a primary reversion state.

Referring to FIGS. 7 and 8, a membrane 53 further includes a second reversion inducing groove 532 configured to induce secondary reversion of the membrane 53 in the vicinity of a boundary line between a second step part 142 and a short-circuit hole 42 in the cap plate 20. In one embodiment, a first thickness t1 of the membrane 43 in the area of a first reversion inducing groove 531 may be smaller than a second thickness t2 of the membrane 43 in the area of the second reversion inducing groove 532. Therefore, the membrane 53 may be primarily reversed or deflected along the first reversion inducing groove 531 (see FIG. 8) and be secondarily reversed or deflected along the second reversion inducing groove 532 (see FIG. 9) by the internal pressure in the rechargeable battery.

In the case in which the rechargeable battery according to a second exemplary embodiment is operating normally such that the internal pressure of the rechargeable battery is within a stable range, the membrane 53 of the external short-circuit part 50 covers the short-circuit hole 42 and is spaced apart from the short-circuit protrusion 45 of the connection plate 44, as shown in FIG. 7.

As shown in FIG. 8, when the internal pressure of the rechargeable battery rises, the membrane 53 ascends or deflects toward the short-circuit protrusion 45 of the connection plate 44 and is supported by the second step part 142. Accordingly, the membrane 53 is bent along the first reversion inducing groove 531 and into the primarily reversed position or state. The membrane 53 is bent along the first reversion inducing groove 531 and a circumferential portion of the membrane 43 is uniformly supported by the second step part 142 in the cap plate 20.

Figure 9:
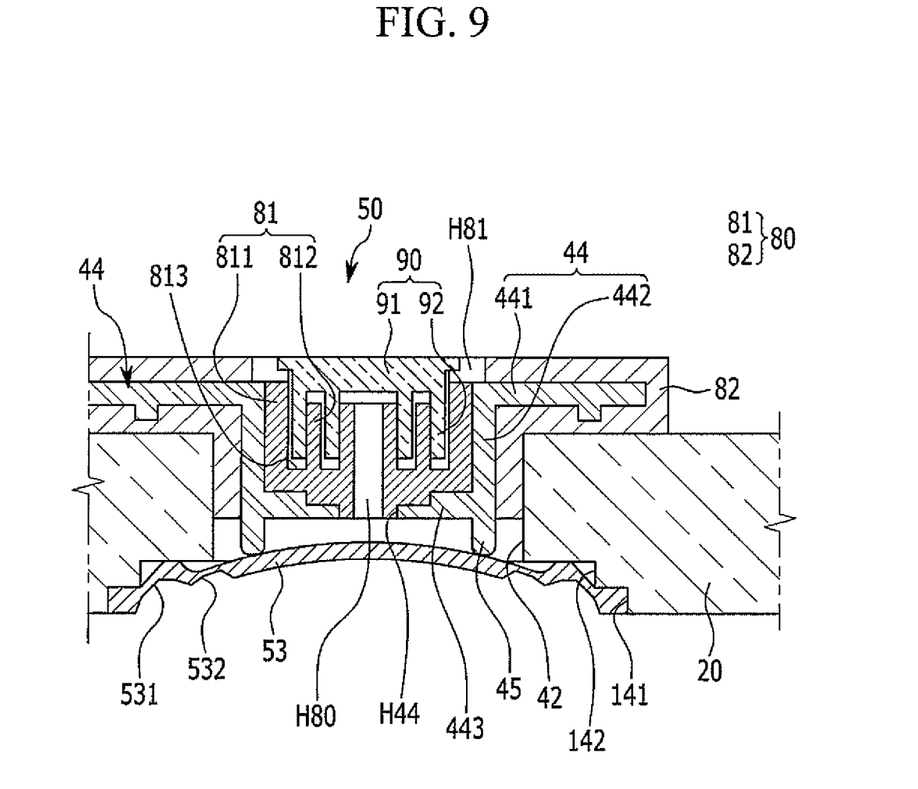
FIG. 9 is a cross-sectional view showing a secondary reversion state of the membrane in the external short-circuit part of FIG. 7.

FIG. 9 is a cross-sectional view showing the membrane 53 in the external short-circuit part 50 of FIG. 7 in a secondary reversion state. As shown in FIG. 9, when the internal pressure of the rechargeable battery further rises, the membrane 53 further ascends or deflects toward the short-circuit protrusion 45 of the connection plate 44. A circumferential portion of the membrane 53 remains supported by the second step part 142 when the membrane 53 is in the secondary reversion state.

In one embodiment, an outer circumferential portion of the membrane 53 is supported by the second step part 142 and an inner portion of the membrane 53 is secondarily reversed to uniformly contact the short-circuit protrusion 45, as illustrated in FIG. 9. As compared with the membrane 43 according to a first exemplary embodiment, the membrane 53 according to a second exemplary embodiment further includes the second reversion inducing groove 532, such that the mechanical resistance of the membrane 53 against being secondarily reversed may be reduced.

When the membrane 53 is uniformly short-circuited to the short-circuit protrusion 45 of the connection plate 44, a current in the electrode assembly 10 is discharged through the membrane 53 and the connection plate 44, which form a low resistance structure.

When the membrane 53 is primarily and secondarily reversed as illustrated in FIG. 9, the internal pressure in the rechargeable battery sequentially passes through the outlet H80 of the inner insulating part 81, the first barrier 812, and the second barrier 92, and is then discharged to a final outlet H81.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
  a case having an electrode assembly accommodated therein;
  a cap plate closing an opening of the case, the cap plate comprising a short-circuit hole, a first step extending around an outer circumference of the short-circuit hole, the first step having an inner diameter larger than an inner diameter of the short-circuit hole, and a second step between the first step and the short-circuit hole, the second step having an inner diameter that is larger than the inner diameter of the short-circuit hole and smaller than the inner diameter of the first step;
  first and second electrode terminals extending through the cap plate and electrically coupled to the electrode assembly; and
  an external short-circuit part coupled to an outer portion of the case for electrically disconnecting or short-circuiting the first and second electrode terminals from or to each other,
  wherein the external short-circuit part comprises:
    a membrane coupled to an inner surface of the first step in the cap plate that faces the electrode assembly and electrically coupled to the second electrode terminal, the membrane extending around an outer circumference of the short-circuit hole in the cap plate to cover the short-circuit hole, the membrane comprising a first reversion-inducing groove and a second reversion-inducing groove configured to induce reversion of the membrane when an internal pressure of the rechargeable battery exceeds a threshold pressure; and a connection plate electrically coupled to the first electrode terminal and spaced from the membrane.

2. The rechargeable battery of claim 1, wherein:
the connection plate comprises:
a plate part coupled to the first electrode terminal; and
a cylindrical part protruding from the plate part toward the membrane, wherein the cylindrical part is in the short-circuit hole and is spaced from an inner surface of the short-circuit hole.

3. The rechargeable battery of claim 2, wherein the connection plate further comprises a short-circuit protrusion protruding from a lower end of the cylindrical part toward the membrane.

4. The rechargeable battery of claim 3, wherein a lowermost end of the short-circuit protrusion and a top surface of the second step in the cap plate have a height difference therebetween.

5. The rechargeable battery of claim 3, wherein the first reversion inducing groove is configured for inducing primary reversion of the membrane in the vicinity of a boundary between the first step and the second step in the cap plate.

6. The rechargeable battery of claim 5, wherein the second reversion inducing groove is configured for inducing secondary reversion of the membrane in the vicinity of a boundary between the second step and the short-circuit hole.

7. The rechargeable battery of claim 6, wherein a first thickness of the membrane in an area of the first reversion inducing groove is smaller than a second thickness of the membrane in an area of the second reversion inducing groove.

8. The rechargeable battery of claim 2, further comprising:
an insulator coupled to a through-hole of the connection plate, the insulator having an outlet for discharging internal pressure when the membrane is reversed; and
a closure coupled to the insulator, the closure configured to discharge the internal pressure and block introduction of foreign materials into the outlet.

9. The rechargeable battery of claim 8, wherein the insulator comprises:
an inner insulating part in the cylindrical part; and
an outer insulating part connected to the inner insulating part, the outer insulating part extending along outer surfaces of the plate part and the cylindrical part and wherein at least a portion of the outer insulating part is received in the short-circuit hole.

10. The rechargeable battery of claim 9, wherein the membrane extends in the same direction as a portion of the outer insulating part that is in the short-circuit hole and the cylindrical part.

11. The rechargeable battery of claim 10, wherein the inner insulating part comprises:
a first inserting part form-fit to the through-hole, a bottom, and an inner surface of the cylindrical part, and having an open upper side; and
a first barrier radially spaced from the first inserting part to form an accommodating groove therebetween.

12. The rechargeable battery of claim 11, wherein the closure comprises:
a second barrier inserted into the open upper side of the first inserting part and inserted into the accommodating groove; and
a cover part connected to one side of the second barrier and covering at least a portion of the first inserting part.

* * * * *